United States Patent Office 3,266,036
Patented August 9, 1966

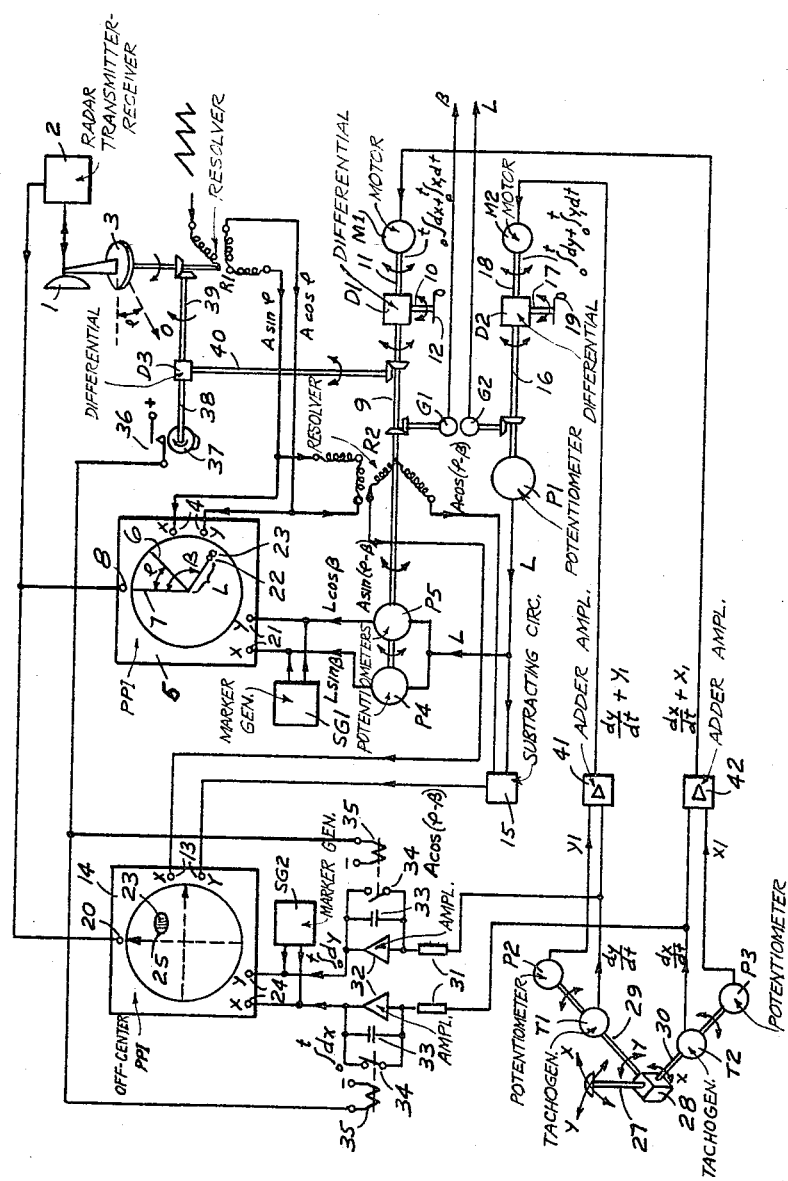

3,266,036
RADAR SYSTEM FOR TARGET TRACKING
Åke Hugo Petrus Blomqvist and Karl Göran Folke Lind, Karlskoga, Sweden, assignors to Aktiebolaget Bofors, Bofors, Sweden, a Swedish company
Filed May 20, 1964, Ser. No. 368,837
Claims priority, application Sweden, May 24, 1963, 5,800/63
6 Claims. (Cl. 343—11)

The present invention is related to a search radar system of the type, which is provided with an equipment for target tracking. A search radar system of this type comprises in the conventional manner an antenna which is connected to a transmitter-receiver-equipment for radar pulses and which is continuously scanning a substantial area, generally by continuous rotation of the antenna with a constant speed through 360°, and a PPI scope for displaying the total area scanned by the antenna together with radar echoes received from this area. On the display screen of the PPI scope one has consequently a picture of the total scanned area with all objects within this area, which have been detected by the radar apparatus by reception of radar pulses reflected from these objects. For target tracking the system is also provided with an equipment for selecting a small cut-out section of the total area scanned by the antenna and for displaying this cut-out section and the echoes received therefrom on the display screen of a substantially orthogonal range display such as a B-scope or an offset center PPI-scope on an enlarged scale relative to the display on the screen of the PPI-scope. This equipment comprises adjustable means, by means of which the selected cut-out section can be moved arbitrarily within the total scanned area so that any arbitrary section of this area can be displayed on the screen of the B-scope. An operator can consequently, guided by the PPI scope display, move the selected cut-out section so that it will include a certain echo visible on the PPI scope display, which one wishes to select and track. This echo will then also appear in the enlarged display of the selected cut-out section on the B-scope screen and the operator can now, guided by the enlarged display on the B-scope, move the selected cut-out section so that its center coincides with the selected echo, that is, so that the echo will be situated in the center of the display screen of the B-scope. When this is done, the direction and the distance to the selected cut-out section will correspond to the direction and the distance to the selected echo. These data can be picked up from the control means, by means of which the position of the cut-out section within the total scanned area can be changed, and used as input data in, for instance, a fire control computer for a weapon which is to fire at the selected target. If the operator can move the selected cut-out section, when the selected target is moving, in such a way that the center of the cutout section is always coincident with the position of the target, that is, so that the echo from the target is always kept in the center of the display screen of the B-scope, one will obviously have continuous information about the distance and the direction to the selected target. In this way the search radar system can also simultaneously be used for fire control and no special fire control radar equipment is necessary.

In a system of this type it is, however, rather difficult for the operator to center the selected cut-out section rapidly on a predetermined echo and subsequently to follow the echo so that it will always be situated in the center of the selected cut-out section, that is, in the center of the display screen of the B-scope. This is due to the fact that the scanning radar antenna has a comparatively low rate of scanning, normally about 20 to 30 rotations per minute. Accordingly, new information about the position of the selected target is obtained only every second or third second. The echo from the selected target will consequently appear on the display screen of the B-scope only every second or third second. If the echo is then not situated in the center of the display screen of the B-scope, that is, in the center of the selected cut-out section, the operator must correct the position of the selected cut-out section. He corrects the bearing and range of the selected cut-out section in such a way that the next time the radar antenna scans the sector angle within which the cut-out section is situated, the echo received from the selected target will appear in the center of the display screen of the B-scope. Consequently the selected cut-out section is centered on the target and correct information about the direction and the distance to the target can be obtained. It has been found, however, that great skill and an extensive training are required for the operator to center the cut-out section on the selected target rapidly and thereafter to follow the target with the cut-out section so that the target will always be situated in the center of the cut-out section and the distance and the direction to the target can be exactly measured. It is extremely important for the operator to rapidly center the cut-out section on the selected target so that the weapon, which is directed according to the data about range and direction to the target given by the radar equipment, can be rapidly brought to fire. Successful firing also requires that the operator can thereafter with sufficient accuracy follow the movement of the target with the cut-out section.

An object of the invention is therefore to provide a search radar system including means for target tracking of the type described above, in which it is considerably easier for the operator to center the selected cut-out section rapidly on a target, so that the echo from the target will appear in the center of the display screen of the B-scope, and thereafter to follow the target with good accuracy so that the echo from the target is kept in the center of the display screen of the B-scope.

Briefly, the invention contemplates a radar system comprising means for producing a marker on the display screen of the B-scope including a manual control means for moving the marker over the display screen of the B-scope. Signal generators are connected to said manual control means for generating control signals for determining the position, within the total scanned area, of the selected cut-out section displayed on the display screen of the B-scope. According to the invention it is preferred that the means determining the position of the cut-out section within the total scanned area and the signal generators connected to the manual control means are arranged in such a manner that the cut-out section positioning means will, in response to the control signals from the signal generators, move the cut-out section within the total scanned area on the one hand each time the manual control means is actuated, over a distance proportional to the magnitude of the movement of the manual control means and on the other hand continuously with a speed proportional to the deviation of the manual control means from its predetermined neutral position, that, over a distance which is proportional to the time integral of the deviation of the manual control means from its neutral position. Furthermore, the system according to the invention comprises preferably means responsive to the scanning motion of the antenna for automatically resetting the marker to a predetermined neutral position on the display screen of the B-scope, preferably to the center of the screen, immediately before the antenna scans the sector angle, within which the selected cut-out section is presently situated, without any simultaneous change of the position of the manual control means. Preferably, the marker producing means are so controlled by the manual control means that, for each movement of the manual control means, the marker is moved a corresponding distance over the display screen of the B-scope.

Because it is necessary to be able to change the bearing and range of the selected cut-out section within the total scanned area, the manual control means consists preferably of a control lever or a similar device, which can be moved in a substantially orthogonal coordinate system; movements of the control lever in the directions of the two coordinates influencing, on the one hand, the marker producing means to move the marker in lateral and vertical direction respectively on the display screen of the B-scope, and, on the other hand, the means determining the position of the cut-out section within the total scanned area to move the cut-out section in bearing and range respectively.

In a system according to the invention an operator can in the conventional manner, guided by the display of the total scanned area on the screen of the PPI scope of the system, by means of coarse adjusting means move the selected cut-out section so that it will include the echo, which one wishes to track. This echo will then appear on the display screen of the B-scope, but as the adjustment made by guidance of the display on the PPI scope can only be very coarse, the echo will normally not appear in the center of the display screen of the B-scope, that is, the selected cut-out section will not be exactly centered on the selected target. Another operator or the same operator, when the antenna scans the sector angle within which the cut-out section is situated, causing the selected echo to appear on the screen of the B-scope, can now simply move the marker on the display screen of the B-scope by means of the manual control means. As previously described, the marker has been reset to the center of the display screen immediately before the scanning of the cut-out section. The operator has only to move the marker in such way that the marker coincides with the echo on the display screen of the B-scope. Because the display screen of the B-scope has a certain after-glow causing the echo to remain on the display screen for some time after the scanning of the antenna of the cut-out section, this is a very simple operation to perform. The means for determining the position of the cut-out section within the total scanned area will then, in response to the control signals from the signal generators connected to the manual control means, start to move the cut-out section towards the selected target. Immediately before the next scanning of the selected cut-out section, that is after an interval of 2 to 3 seconds, the marker is automatically reset to the center of the display screen of the B-scope. If at this second scanning of the cut-out section the selected echo is still not situated in the center of the display screen of the B-scope, the operator need only, by means of the manual control means, move the marker on the display screen of the B-scope in such a way that it coincides with the new position of the echo, whereby the cut-out section will in response to the control signals from the signal generators connected to the control means be moved further towards the selected echo. In a system according to the invention, which has been dimensioned in the best possible way, the cut-out section will be exactly centered on the selected target, so that the echo appears in the center of the display screen of the B-scope, not later than during the third scanning of the cut-out section, that is, only 4 to 6 seconds after the first correction was made by means of the manual control means. Furthermore, if the target is moving with a constant speed on a straight course, the cut-out section will thereafter automatically follow the target without any further corrections.

In a system according to the invention much less skill is required of the operator than in previously known systems of this type and, in spite of this, a much more rapid centration of the cut-out section on the selected target and a more accurate tracking of the target are obtained. Thus the target can be put under fire much more rapidly and a much greater accuracy of aim can be achieved.

In the following, the invention will be described more in detail with reference to the accompanying drawing, in which by way of example an embodiment of a system according to the invention is schematically shown.

The radar system shown in the drawing comprises a radar antenna 1, which is connected in the normal way to a transmitter-receiver 2. It is assumed that the antenna is mounted on a constant speed continuously rotating platform 3 so that the antenna is continuously scanning the surrounding area through 360°. The scanning motion of the antenna is in a suitable conventional manner, only schematically shown in the drawing, transferred to the rotor of an electric resolver R1. The rotor of this resolver is provided with a winding supplied with a saw tooth sweep voltage having a frequency corresponding to the pulse frequency of the transmitter-receiver 2. From the two stator windings of the resolver R1 signal voltages proportional to $A \sin \varphi$ and $A \cos \varphi$ respectively are consequently transmitted. $A$ is the momentary value of the sweep voltage connected to the rotor winding of the resolver and $\varphi$ is the angle between the momentary direction of the antenna 1 and a fixed reference direction 0 in the site of the antenna. In the values of the different signal voltages, which are inserted in the drawing no factors of proportionality have been included, but for the sake of simplicity only the expression for the varying portion of each signal voltage is shown. The two signals from the stator windings of the resolver R1 are connected to the two reflection input terminals 4 for the X-deflection and the Y-deflection respectively on a PPI scope 5. On the display screen of the PPI scope, there is thus, in the conventional manner, generated for each period of the sweep voltage a radial sweep 6, which rotates about the center of the display screen in synchronism with the rotation of the antenna 1 and which forms the angle $\varphi$ with a reference direction 7 on the display screen. Radar echoes received from objects within the area scanned by the antenna 1 are connected from the radar transmitter receiver-equipment 2 to the video input 8 of the PPI scope 5 and will consequently appear as brilliant points on the sweep 6.

For the selection of a small cut-out section within the total area scanned by the antenna and displayed on the screen of the PPI scope 5 the voltages from the stator windings of the resolver R1 are connected to the stator windings of a second resolver R2. The rotor of the resolver R2 is provided with two windings and is coupled to the output shaft 9 from a differential gear D1, which is provided with two input shafts 10 and 11. Shaft 10 is manually rotatable by means of a crank 12, whereas shaft 11 can be rotated by an electromotor M1. From the two rotor windings of the resolver R2 the voltages $A \sin (\varphi - \beta)$ and $A \cos (\varphi - \beta)$ are obtained, where $\beta$ is the relative angle between the stator windings and the rotor windings of the resolver R2, that is, the angle of rotation of the rotor shaft 9 from a predetermined starting position. These two voltages are connected to the deflection input terminals 13 for X- and Y-deflection respectively on a B-scope 14. The voltage $A \cos (\varphi - \beta)$, which is connected to the Y-deflection passes through a subtracting circuit 15, in which another voltage is subtracted as will be further described in the following. When the direction of the antenna 1 forms the angle $\beta$ with the fixed reference direction 0 in the site of the antenna and thus the sweep 6 on the display screen of the PPI scope 5 forms the same angle $\beta$ with reference direction 7 on the screen, the sweep on the display screen of the B-scope 14 will consequently coincide with the Y-axis on this display screen. The deflector system of the B-scope 14 has such an amplification factor and includes such bias voltages that only those sweeps, which are close to the direction $\beta$ on both sides thereof, for instance, within the sector angles $\beta \pm 0.1$ radian, will be displayed on the display screen of the B-scope. The Y-deflection of the B-scope has such a large amplification that only a small portion of the total length of the sweep 6 on the PPI scope 5, for instance 1,000 meters, can be displayed on the display screen of the B-scope. Consequently, the display screen of the B-scope 14 displays on an enlarged scale a small portion of the total area displayed on the screen of the PPI 5. The direction to this cut-out section will be an angle $\beta$ determined by the rotation of the shaft 9. The distance to the selected cut-out section displayed on the B-scope 14 is determined by a potentiometer P1, which is fed from a constant voltage and which is coupled to the output shaft 16 from a differential gear D2 provided with two input shafts 17 and 18. Shaft 17 is manually rotatable by means of a crank 19, whereas the other input shaft 18 can be rotated by an electromotor M2. Consequently the output voltage L from the potentiometer P1 will be proportional to the angle of rotation of the shaft 16 from a predetermined starting position and this voltage in subtracting circuit 15 is subtracted from the voltage $A \cos(\varphi - \beta)$ received from one of the rotor windings of the resolver R2. The difference voltage is supplied to the Y-deflection of the B-scope 14. The voltage L from the potentiometer P1 will consequently serve as a bias voltage for the Y-deflection of the B-scope 14 and thus determine the portion of the total sweep, which will be displayed on the screen of the B-scope, and thereby the distance to the cut-out section displayed on the B-scope. The distance to the selected cut-out section corresponds consequently to the voltage L and is determined by the angular position of the shaft 16 relative to a predetermined starting position. If the distance L to the cut-out section is not too small, the cut-out section will be displayed on the screen of the B-scope in a substantially orthogonal coordinate system, in which the X-coordinate represents the lateral deviation from the direction $\beta$ and the Y-coordinate represents the deviation in range from the distance L. The radar echoes received are fed from the transmitter-receiver-equipment 2 to the video input 20 of the B-scope 14 so that those targets that are located within the selected cut-out section will appear on the display screen of the B-scope.

For indication on the display screen of the PPI scope 5 of the position of the selected cut-out section within the total scanned area, the deflection system of the PPI scope is provided with marker input terminals 21, to which deflection voltages from a marker generator SG1 are supplied. This marker generator produces deflection voltages having such a waveform that they produce a suitable marker 22, for instance a circle, on the display screen of the PPI scope. The deflection voltages for the marker 22 are very rapid and are applied immediately before each period of the sweep voltage and thus immediately before the generation of the sweep 6. The position of the marker 22 on the screen of the PPI scope is determined by voltages from two potentiometers P4 and P5 connected to the marker input terminals 21 together with the deflection voltages from the marker generator SG1. Potentiometers 4 and 5 are mechanically coupled to the shaft 9. The potentiometer P4 is a so-called sine-potentiometer having an output voltage proportional to the sine of its angle of rotation, whereas the potentiometer P5 is a so-called cosine-potentiometer having an output voltage proportional to the cosine of its angle of rotation. The potentiometers P4 and P5 are supplied by the voltage L from the potentiometer P1. The output voltages from the potentiometers P4 and P5 are consequently $L \sin \beta$ and $L \cos \beta$ respectively. Accordingly the marker 22 will be situated on a line defining the angle $\beta$ from the reference direction 7 on the screen of the PPI scope and on the distance L from the center of the screen, that is, the position of the marker will indicate the position of the selected cut-out section within the total scanned area. An operator can thus by rotation of the crank 12 move the marker 22 in a peripheral direction on the screen of the PPI scope and by rotation of the crank 19 move the marker 22 in a radial direction on the screen. At the same time the position of the cut-out section displayed on the screen of the B-scope 14 will be changed in the same way.

To track a certain echo 23 detected on the display screen of the PPI scope 5, the operator moves the marker 22 over the screen of the PPI by means of the cranks 12 and 19 in such a way that the marker will enclose the echo 23, whereby this echo will be displayed on the screen of the B-scope 14 on an enlarged scale.

The display on the PPI scope 5 and the cranks 12 and 19 however permits only a very coarse adjustment of the position of the selected cut-out section, and this section will not be exactly centered on the selected echo 23 and this will consequently not appear in the center 26 of the display screen of the B-scope 14. Hence the setting of the shafts 9 and 16 will not exactly represent the direction and the distance to the selected echo. This is however necessary, as these quantities are to be picked up from these shafts by means of two signal transmitters G1 and G2 coupled to the shafts, the output signals which are used for instance as input data to a fire control computer for a weapon which is to fire at the selected target.

In order to make it easier for the operator to center the cut-out section on the selected echo and to follow the movement of the echo with the cut-out section so that the output signals from the signal transmitters G1 and G2 will exactly represent the direction and the distance respectively to the selected target, the deflector system of the B-scope 14 is provided with two marker input terminals 24. To these terminals deflection voltages are supplied from a marker generator SG2 having such a wave-form that a marker 25 is produced on the display screen of the B-scope. This marker may have any shape but is preferably elliptical, whereby it will correspond to the shape of an echo appearing on the screen. The deflection voltages from the marker generator SG2 for the production of the marker 25 are, exactly as the deflection voltages from the marker generator SG1 for the PPI scope 5, very rapid and are applied immediately at the beginning of each period of the sweep voltage so that the marker 25 is produced immediately before each normal sweep. When only the deflection voltages from the marker generator SG2 are supplied to the marker input terminals 24, the marker 25 will be situated in the center 26 of the screen of the B-scope. For moving the marker 25 over the screen of the B-scope 14 the operator has a manual control lever 27, which is freely pivotable in all directions about its lower end. This lower end is connected to a mechanical gear device so that the upper end of the lever can be freely moved in a substantially orthogonal cordinate system. The mechanical gear device 28 is provided with two output shafts 29 and 30, which are influenced by the movement of the control lever 27. The shaft 29 is rotated in response to a movement of the control lever 27 in the Y-direction of the coordinate system, whereas the other shaft 30 is rotated in response to a movement of the control lever in the X-direction of the coordinate system. A tachogenerator T1 is coupled to the shaft 29 and correspondingly a tachogenerator T2 is coupled to the other shaft 30. The tachogenerator T1 produces consequently a signal voltage proportional to $dy/dt$, that is, to the rate of displacement of the control lever 27 in the Y-direction. The tachogenerator T2 produces a signal proportional to $dx/dt$, that is, to the rate of displacement of the control lever 27 in the X-direction. The output voltages from the tachogenerators T1 and T2 are each connected through an integrating circuit to the X-terminal and the Y-terminal respectively of the marker input terminals 24 of the B-scope 14 together with the deflection voltages from the marker generator SG2. Each integrating circuit comprises a resistance 31 in series with an amplifier 32 provided with a feed-back through a capacitance 33. The voltage connected to the X-terminal from the associated integrating circuit is thus proportional to $$\int_0^t dx$$

while the voltage connected to the Y-terminal from its integrating circuit is proportional to $$\int_0^t dy$$

When the control lever 27 is moved, the marker 25 on the screen of the B-scope 14 will be moved a corresponding distance and into exactly the same direction within the orthogonal coordinate system on the display screen from the position of the marker before the movement of the control lever 27. A normally open contact 34 of a relay 35 is connected in parallel across each one of the capacitances 33. The relays 35 can be energized, so that the contacts 34 are closed, through a contact 36, which is operated by a cam 37. The cam 37 is rotated by the output shaft 38 of a differential gear D3 having an input shaft 39, which is rotated in step with the rotation of the antenna 1, and a second input shaft 40, which is rotated in correspondence to the rotation of the shaft 9, which determines the direction to the selected cut-out section. The cam 37 is so mounted on the shaft 38 that it closes the contact 36 and energizes the respective relay 35 immediately before the antenna 1 is starting to scan the sector angle, within which the selected cut-out section is situated. The relays 35 then close their contacts 34 so that the feed-back capacitances 33 of the integrating circuits will be short-circuited, whereby the voltages from the integrating circuits connected to the marker input terminals 24 of the B-scope are short-circuited so that the marker 25 is reset to the center 26 of the display screen, without any simultaneous movement of the control lever 27. If the control lever 27, after this resetting of the marker 25, is moved again, the marker 25 will in the manner described above be displaced from the center 26 of the screen of the B-scope a corresponding distance in the same direction.

In addition to the tachogenerator T1 a potentiometer P2 is also connected to the shaft 29, which copies the movement of the control lever 27 in the Y-direction, and in the same manner a potentiometer P3 is connected to the shaft 30, which copies the movement of the control lever 27 in the X-direction. The output voltage from the potentiometer P2 is consequently proportional to $y_1$, that is, to the deflection of the lever 27 from a predetermined neutral position in the Y-direction of the coordinate system. The output voltage from the potentiometer P3 will be proportional to $x_1$, that is, to the deflection of the control lever 27 from its neutral position in the X-direction of the coordinate system. The voltages from the tachogenerator T1 and the potentiometer P2 are added in an amplifier 41 and the output voltage $dy/dt+y_1$ from this is connected to the electromotor M2. In the same way the voltages from the tachogenerator T2 and the potentiometer P3 are added in an amplifier 42 and the output voltage $dx/dt+x_1$ from this is connected to the electromotor M1. The electromotors M1 and M2 are rotating with a speed proportional to the control voltage applied to each motor. Consequently the motor M1 will rotate the input shaft 11 of the differential gear D1 and thus the output shaft 9 through an angle proportional to $$\int_0^t dx + \int_0^t x_1 dt$$

In the same way the motor M2 will rotate the input shaft 18 of the differential gear D2 and thus the output shaft 16 of the differential through an angle proportional to $$\int_0^t dy + \int_0^t y_1 dt$$

For each displacement of the control lever 27 the motor M1 will consequently by rotation of the shaft 9 move the selected cut-out section in a lateral direction through a distance corresponding to the displacement of the control lever 27 in the X-direction. Furthermore, the motor M1 will by rotation of the shaft 9 continuously move the cut-out section in a lateral direction over a distance, which is proportional to the time integral of the deflection of the control lever 27 in the X-direction from its neutral position. In the same way the motor M2 will for each displacement of the control lever 27 by rotation of the shaft 16 move the selected cut-out section in range a distance, which is proportional to the displacement of the control lever 27 in the Y-direction. The motor M2 will by rotation of the shaft 16 continuously move the cut-out section in range over a distance, which is proportional to the time integral of the deflection of the control lever 27 in the Y-direction from its neutral position.

Assume now that the operator has, guided by the display on the display screen of the PPI scope 5 and by the marker 22, by rotation of the two cranks 12 and 19 moved the cut-out section within the total area scanned by the radar equipment in such a way that the cut-out section encloses an echo 23, which is to be tracked. This echo 23 will consequently appear on the display screen of the B-scope 14, but it will most probably be situated at a certain distance from the center 26 on the display screen as shown in the drawing. In order to center the cut-out section exactly on the selected target so that the echo 23 will appear in the center 26 of the screen of the B-scope 14, the operator has now only, when the antenna scans the cut-out section and thus the echo 23 appears on the display screen of the B-scope, to move the marker 25 which has been automatically reset to the center 26 immediately before the scanning of the cut-off section as described above, by means of the control lever 27 in such a way that the marker 25 is moved over the display screen of the B-scope to such a position that it encircles the echo 23. Thereby the two motors M1 and M2 will receive such control voltages from the tachogenerators T1 and T2 and the potentiometers P2 and P3 that the motors in cooperation move the cut-out section toward the echo a distance corresponding to the displacement of the control lever 27. Furthermore, the motors M1 and M2 will continue to move the cut-out section toward the echo over a distance, which is proportional to the time integral of the deflection of the control lever from its neutral position, that is, with a speed which is proportional to the deflection of the control lever 27 from its neutral position. This continuous movement of the cut-out section will go on so long as the control lever 27 is not moved again. Immediately before the antenna scans the cut-out section the next time, which it will, as already mentioned, normally do after 2 to 3 seconds, the marker 25 is automatically reset to the center 26 of the screen of the B-scope without any change of the position of the control lever 27. If this second scanning of the cut-out section shows that the echo 23 is still not situated in the center 26 of the display screen of the B-scope, the operator has once more only to move the marker 25 by means of the control lever 27 from the center 26 to a position in which it encloses the echo. As a result the motors M1 and M2 will once more move the cut-out section towards the echo a distance corresponding to the last displacement of the control lever 27 and will furthermore start to move the cut-out section continuously towards the echo with a speed corresponding to the new deflection of the control lever from its neutral position, which it has obtained after the last displacement of the control lever. The measures that the operator has to take are consequently extremely simple and very easy to learn and to carry out with great accuracy. In spite of this a rapid centration of the cut-out section on the selected target is achieved. Thereafter; the cut-out section will follow the target very accurately. The convergence of this centration process can be influenced by selection of the factors of proportionality for the two signal voltages added in the amplifier 41 and the amplifier 42 respectively. It can be shown that with optimal design of the equipment and with an operator, which for each scanning of the cut-out section very rapidly and exactly positions the marker 25 on the display screen of the B-scope to coincide with the echo, the cut-out section will be exactly centered on the selected target after three scannings thereof at the most. Consequently, the transmitters G1 and G2 produce output signals, which are accurate measures of the direction and the range respectively to the selected target. If the target is moving with a constant speed on a straight course, the cut-out section will subsequently follow the target substantially exactly without any intervention from the operator.

Conventional radar PPI scopes, radar B-scopes, resolvers, and marker generators suitable for the purpose of the invention are well known in the art and described for instance in the following publications:

"MIT Radiation Laboratory Series" Part 1, Ch. "Radar Indicators" pages 167–171; part 22, Ch. "Radar Display" pages 17–22; part 22, Ch. "Electronic Markers and Indices" pages 227–250, Sidney A. Davis, Byron K. Ledgerwood "Electromechanical Components for Servomechanisms," McGraw-Hill, New York 1962, pages 162–182.

It should be observed that the radar system shown in the drawing and described above is only a schematic example of a possible realization of a radar system according to the invention and that such a system can be realized in various other ways and by means of other components.

What is claimed, is:

1. A radar system comprising transmitting and receiving means for radar signals including an antenna for scanning a substantial area about the antenna, a PPI scope for displaying the total area scanned by said antenna and any radar echoes received from said area, a substantially orthogonal range bearing display having a display screen for displaying a small selected section of said total scanned area and any radar echoes received from said selected section on a larger scale than on said PPI scope, variable position-selecting means for selecting the position of said selected section within said total scanned area, signal-responsive means for operating said position-selecting means to change the position of said selected section within said total scanned area, means for producing a movable marker on the display screen of said range bearing display, manual control means for moving said marker over the display screen of said range bearing display, signal-generating means connecting to said manual control means for generating control signals representative of the movement and position of said manual control means, said control signals being supplied to said signal-responsive means operating said position-selecting means, whereby the position of said selected section within said total scanned area is dependent on the movement and position of said manual control means.

2. A radar system comprising transmitting and receiving means for radar signals including an antenna for scanning a substantial area about the antenna, a PPI scope for displaying the total area scanned by said antenna and any radar echoes received from said area, a substantially orthogonal range bearing display having a display screen for displaying a small selected section of said total scanned area and any radar echoes received from said selected section on a larger scale than on said PPI scope, variable position-selecting means for selecting the position of said selected section within said total scanned area, signal-responsive means for operating said variable position-selecting means to change the position of said selected section within said total scanned area, means for producing a movable marker on the display screen of said range bearing display, manual control means for moving said marker over the display screen of said range bearing display, signal-generating means connecting to said manual control means for generating control signals representative of the rate of movement of said manual control means and of the deflection of said control means from a predetermined neutral position for said control means, said signal-responsive means operating said variable position-selecting means being responsive to said control signals for changing the position of said selected section within said total scanned area rapidly for each displacement of said manual control means by an amount proportional to the displacement of said control means and for changing the position of said selected section continuously by an amount proportional to the time integral of the deflection of said control means from said neutral position.

3. A radar system as claimed in claim 1, comprising means responsive to the scanning motion of said antenna for automatically resetting said marker to a predetermined neutral position on the display screen of said range bearing display immediately before the scanning of said antenna of the sector angle within which said selected section is presently situated.

4. A radar system as claimed in claim 1, wherein said variable position-selecting means includes variable bearing-selecting means for selecting the bearing angle to said selected section and variable range-selecting means for selecting the range to said selected section, said signal-responsive means include first servomotor means operating said variable bearing-selecting means for changing the bearing angle to said selected section with a rate proportional to a control signal supplied to said first servomotor means and second servomotor means operating said variable range-selecting means for changing the range to said selected section with a rate proportional to a control signal supplied to said second servomotor means, said manual control means including a manually movable control member movable in a substantially orthogonal coordinate system, said signal-generating means connected to said manual control means including a first pair of signal generators responsive to the displacement of said control member in one coordinate direction in said coordinate system for generating a first control signal proportional to the rate of displacement of said control member in said coordinate system direction and a second control signal proportional to the deflection of said control member in said coordinate system direction from a predetermined neutral position and a second pair of signal generators responsive to the displacement of said control member in the other direction of said coordinate system for generating a third control signal proportional to the rate of displacement of said control member in said other coordinate system direction and a fourth control signal proportional to the deflection of said control member in said other coordinate system direction from said neutral position, said first and second control signals being connected as control signals to said first servomotor means and said third and fourth control signals being connected as control signals to said second servomotor means.

5. A radar system as claimed in claim 4, wherein said means for producing a movable marker on the display screen of said range bearing display comprises a first signal input terminal for the connection of deflection signals for deflection of the electron ray in the direction of a first axis on the display screen of said range bearing display and a second signal input terminal for the connection of deflection signals for the deflection of the electron ray in the direction of a second axis on the display screen of said range bearing display, a first signal-integrating circuit connecting the signal generator for generating said first control signal to said first signal input terminal and a second signal-integrating circuit connecting the signal generator for generating said third control signal to said second signal input terminal, and marker-producing means feeding additional deflection signals to said first and second signal input terminals.

6. A radar system as claimed in claim 5, comprising means responsive to the scanning motion of said antenna for temporarily short-circuiting said first and second signal-integrating circuits immediately before the scanning of said antenna of the sector angle within which said selected section is presently situated.

No references cited.

CHESTER L. JUSTUS, *Primary Examiner.*

T. H. TUBBESING, *Assistant Examiner.*